United States Patent [19]

Burke

[11] 3,843,834

[45] Oct. 22, 1974

[54] BIDIRECTIONAL LINE DRIVER-RECEIVER CIRCUIT

[75] Inventor: Nelson W. Burke, Stoneham, Mass.

[73] Assignee: Honeywell, Inc., Minneapolis, Minn.

[22] Filed: Oct. 6, 1969

[21] Appl. No.: 863,807

[52] U.S. Cl. .............................................. 178/58 A

[51] Int. Cl. .............................................. H04l 5/16

[58] Field of Search ............ 325/21, 22; 178/58, 59, 178/60; 179/170.2, 170.6, 170.4, 170.8

[56] References Cited

UNITED STATES PATENTS

| | | | |
|---|---|---|---|
| 2,310,060 | 2/1943 | Booth et al. | 325/21 |
| 2,468,552 | 4/1949 | Herrick | 179/170.6 |
| 2,696,529 | 12/1954 | Bachelet et al. | 179/170.8 |
| 3,328,694 | 6/1967 | Brady et al. | 325/21 |

*Primary Examiner*—David L. Stewart

*Attorney, Agent, or Firm*—Faith F. Driscoll; Ronald T. Reiling

[57] ABSTRACT

A bidirectional line driver-receiver circuit operates in first and second modes. When operating in a first mode under the control of a first control signal, the circuit transfers input data signals from a pair of lines to a utilization device and when operating in a second mode under the control of a second control signal, the circuit transfers data output signals derived from the utilization device to the same pair of lines.

14 Claims, 4 Drawing Figures

PATENTED OCT 22 1974

3,843,834

SHEET 1 OF 2

INVENTOR
NELSON W. BURKE

BY
Faith F. Driscoll
ATTORNEY

INVENTOR
NELSON W. BURKE

BY

Faith F. Driscoll

ATTORNEY

BIDIRECTIONAL LINE DRIVER-RECEIVER CIRCUIT

BACKGROUND OF THE INVENTION

This invention relates to line driver circuits and more particularly to differential line driving in a selectively operable bidirectional mode.

Although line driver circuits have been derived in the prior art, in general, these circuits have not solved the basic problem of standard modularity. In more particular terms, the prior technique has generally meant use of separate lines for transmission and reception of digital data as well as separate line driver and line receiver circuits which incorporate special differential amplification techniques in order to achieve the desired noise immunity (i.e., noise rejection).

Another line drive problem in the prior art which has not been solved in a satisfactory manner, is the controlling of the transmitter-receiver (i.e., Tx - Rx) configuration desired in the system. In more particular terms, what is lacking is a uniform control technique whereby a large number of devices can be attached to the same pair of lines and still be operated to interact among themselves in a logical fashion.

SUMMARY OF INVENTION AND OBJECTS

Accordingly, a principal object of the present invention is to provide a relatively simple line driver-receiver circuit which can be interconnected in a complex transmission system as a series of identical modules without requiring additional differential amplifier circuits or a complexity of wire interconnections.

A further object of the present invention is to provide a bidirectional line driver-receiver system wherein a plurality of transmitters and receivers interconnect a plurality of units according to a fixed modular format and are then controlled by a set of bilevel control signals to provide the desired data transmission and reception among the various units of the system.

The above and other objects are provided according to the basic concept of the invention through a unit which is characterized by first and second switching or amplification means controlled by first and second control signals or by a control circuit which is connected to receive a bilevel or a bivalued control signal. One level of the bilevel control signal applied to the control circuit specifies the transmitting operation of the unit wherein the unit transmits data applied to it from a utilization device such as a computer or terminal device, through the line; such data being referred to herein as output data. The second level of the control signal applied to the control circuit specifies the receiving operation at which time the unit passes input signals applied to it from the line to the same utilization device.

In more particular terms, the invention contemplates three differential amplifiers, a first of which constitutes the receiver circuit and provides differential amplification of input signals applied from the line which are transferred to the utilization device. A second differential amplifier constitutes the line driver circuit and transmits a bilevel data signal received from the utilization device through the line in the form of differential line driving signals. A third differential amplifier translates the applied bilevel signal into appropriate switching signals for the first and second differential amplifiers.

In circuit terms, the preferred embodiment includes three transistor differential amplifiers wherein the receiver and transmitter differential amplifiers each have a common emitter circuit, only one of which is activated or enabled at a time. The control circuit may also be a transistor differential amplifier wherein the emitters connect to a common source of potential.

The above and other objects of the present invention are achieved in several illustrative embodiments described hereinafter. The novel features which are believed to be characteristic of the invention, both as to its organization and method of operation, together with further objects and advantages thereof will be better understood from the following description considered in connection with the accompanying drawings. It is to be expressly understood, however, that each of the drawings are for the purpose of illustration and description only and are not intended as a definition of the limits of the invention.

BRIEF DESCRIPTION OF THE DRAWINGS

FIG. 2 is a schematic diagram of one form of the T - R units shown in FIGS. 1 and 1a.

DESCRIPTION OF PREFERRED EMBODIMENT

Figure 1A:
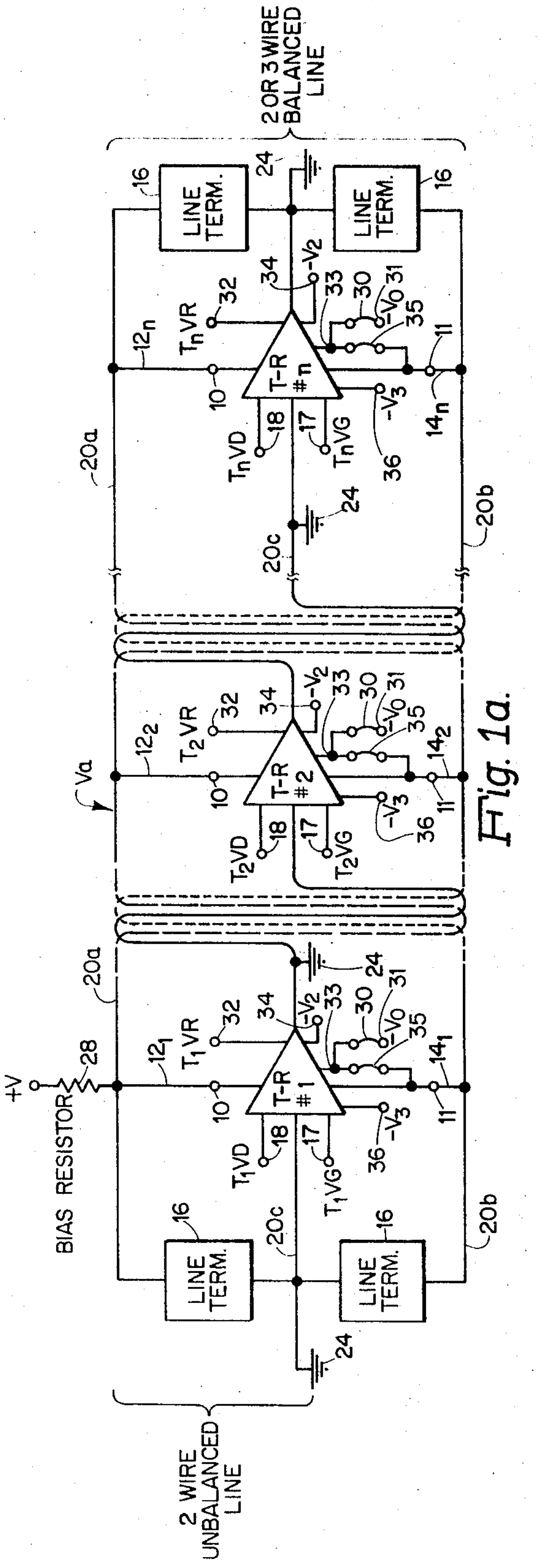
FIG. 1a shows a transmission system employing the transmit-receive (T - R) unit of FIG. 1.
Figure 1:
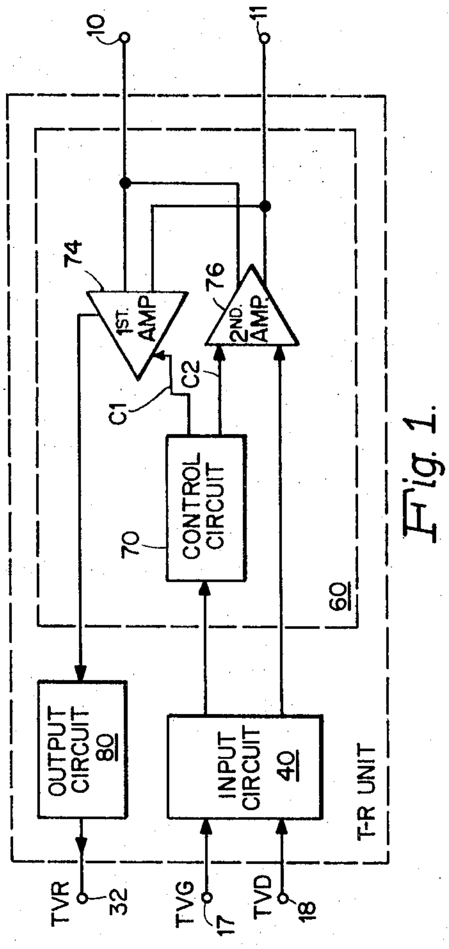
FIG. 1 is a block diagram of a line driver-receiver unit according to the present invention.

Referring now to FIG. 1, it will be noted that a gate control signal, referred to as TVG, is applied to a terminal 17 which connects to an input circuit 40. The circuit 40 provides an input signal, designated VG, for a control circuit 70. The control circuit 70 produces first and second output signals designated as C1 and C2 which are applied respectively to first and second amplifiers 74 and 76. Each of the amplifiers 74 and 76 in turn connect to a pair of output terminals 10 and 11. The input circuit 40 receives a data input signal, referred to as TVD, from input terminal 18 and this signal is passed through the circuit 40 and the amplifier 76.

The transmit-receive (T - R) unit of FIG. 1 operates in either a transmit or receive mode. In a receive mode, the control signal, C1 is "on" or at a logic "true" level. This "on" or "true" level is that voltage level which is necessary to enable the receiver amplifier circuit 74 to pass signals received from the line to its utilization device. Thus, in the receiving mode of operation, the control signal C1 is "on" enabling amplifier 40 to pass the voltage signals applied from the terminal 10 and its complement or its differential pair from the terminal 11 to an output circuit 80. The circuit 80 produces at a terminal 32 a signal, designated as TVR, which represents the received data.

In the transmitting mode, on the other hand, the control signal C2 is "on" while the signal C1 is "off." The amplifier 74 is disabled because of the absence of the "on" level of the control signal C1 while the "on" or "true" level of the control signal C2 enables the amplifier 76. In this case, the data input signal referred to as TVD applied to the input circuit 40 via the terminal 18 passes through the amplifier 76 and is translated into differential line drive signals in turn applied to the output terminals 10 and 11.

In the FIG. 1a, a series of transmit-receive units referenced as T - R 1, 2, . . . N are shown where "N" indicates the number of units within the operating restrictions of the system may be used. Each T - R unit directly couples a different utilization device such as a computer or terminal device for exchanging digital data with other system devices half-duplex (i.e. non-simultaneous) over a multi-conductor transmission line 20.

Since the conductors normally interconnect the T - R units for transfer of signals with relatively short rise and fall times, each conductor can for all practical purposes be treated as a transmission line.

In the FIG. 1a, each T-R unit may be wired to directly couple its utilization device to a balanced or an unbalanced line for transmitting and receiving digital data signals. The term "balanced line" as used herein refers to an arrangement wherein the source impedances (i.e., the impedance of each conductor and line termination) are equal with respect to ground thereby providing a noise signal of equal amplitude on each conductor.

A balanced line is selected for systems operated in a high level noise environment wherein the T - R units are positioned along the line 20 at long distances from one another. By contrast, an unbalanced line is selected when the distance between the T - R units is less and the operating environment is less noisy so as not to affect adversely the operation of the T - R unit.

When coupled to a two conductor balanced line (i.e. earth ground), each of the T - R units 1-N has its output terminals 10 and 11 connected respectively to the conductors 20a and 20b of the multi-conductor twisted transmission line 20. As illustrated in the Figure, the T - R units are connected to the line 20 through the leads $12_1$, $14_1$ through $12_N$, $14_N$. In a three conductor balanced line, each of the T - R units 1 - N additionally connect via a terminal (not shown) to a third conductor, referenced as 20c, which in turn connects to a common reference potential 24, illustrated as ground. Since all T - R units connect to a common reference potential, noise signals otherwise generated by potential differences between the supply voltage common reference potentials of the various T - R units are eliminated.

Both extreme ends of the conductors 20a and 20b of the transmission line 20 are connected to pairs of line terminations 16 which in turn connect to the common reference potential 24. Each of the line terminations 16 can have different impedance values depending on the data transmission rate. More specifically, when the T-R units, 1-N, are required to exchange data signals at bit rates involving transfer of signals having short rise times, the terminations 16 are selected to have values which terminate the line resistively in characteristic impedance thereby preventing signal reflections. However, where data signals with longer rise times are exchanged, the terminations 16 are slected to have values greater than that required to terminate the line 20 resistively in its characterisitic impedance. It has been noted that doubling the impedance value of the termination 16 greatly reduces the total power dissipated by the system without causing any degradation to the shape of data signals exchanged between the units.

Continuing on with the description of FIG. 1a, the conductor 20a connects to one end of a bias resistor 28 which in turn has its other end connected to a supply of positive bias direct voltage, referred to as +V. The positive supply voltage +V, is of a magnitude sufficient to permit T - R units to be added to the system without loading the transmission line so as to interfere with normal system operation.

Further, each of the T - R units has its terminals 31, 34 and 36 connected respectively to supplies of negative direct bias voltage referenced as $-V_0$, $-V_2$ and $-V_3$.

In the balanced line arrangement, a jumper 35 connects a terminal 33 of the receiver differential amplifier of each T - R unit to the terminal 11 which in turn connects to the conductor 20b through the corresponding one of the leads $14_1 - 14_N$.

In the unbalanced line arrangement, each T - R unit has its output terminal 10 connected through a corresponding one of the lines $14_1 - 14_N$ to the conductor 20a and its terminal 33 connected through a jumper 30 to the negative supply of direct bias voltage, $-V_0$. Further, the jumper 35 is removed and the terminal 11 instead of being connected to the conductor 20b through the jumper 30, is connected to the reference potential 24 which corresponds to ground potential.

DETAILED DESCRIPTION OF THE T - R UNIT

Figure 2:
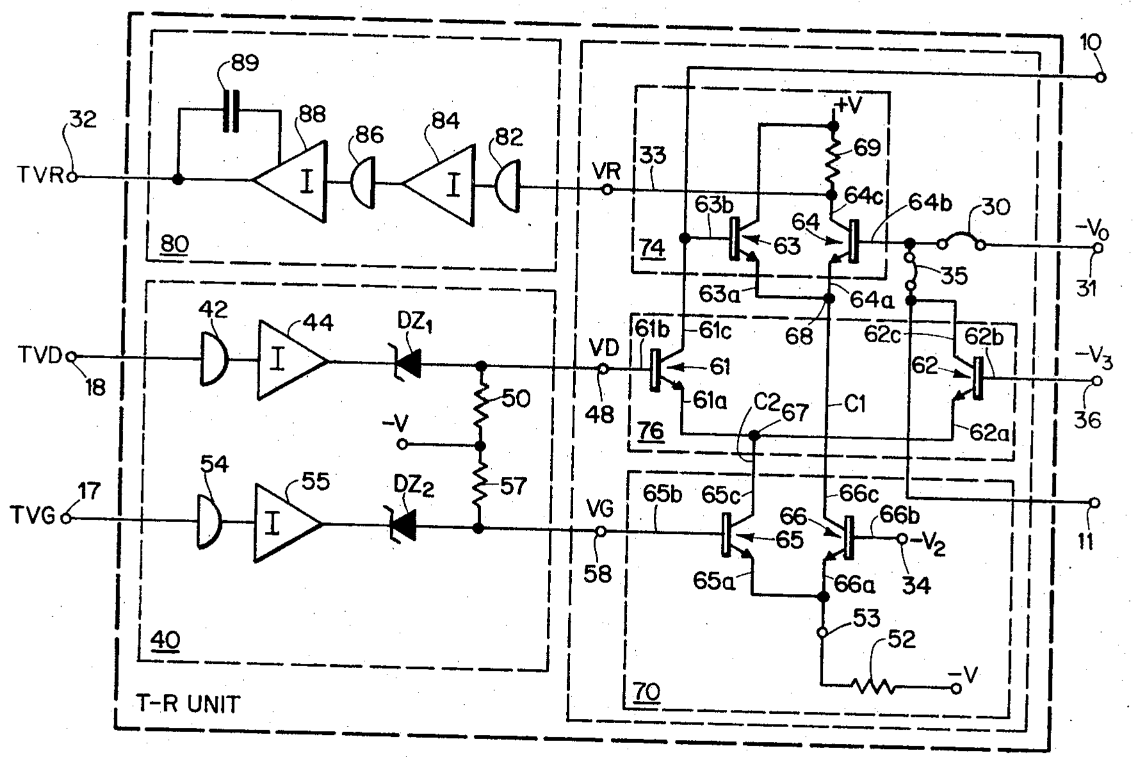

Referring now to FIG. 2, the main sections of an illustrative embodiment of the T - R unit of FIG. 1 are detailed within smaller dashed boxes. As illustrated, these sections include the input circuit 40, the first differential amplifier 74 with output circuit 80, the second differential amplifier 76 and the control circuit 70.

The input circuit 40 converts or shifts the positive voltage levels of the data output signal, TVD, and gate control signal, TVG, generated by the utilization device into negative levels, VD and VG. These levels are in turn directly applied respectively to the differential amplifier 76 and the control circuit 70 by way of the terminals 48 and 58. The input circuit 40 includes a pair of voltage level shifting networks formed respectively by a first zener diode DZ1 in series connection with a resistor 50 and a second zener diode DZ2 in series connection with a resistor 57. Both networks connect to a supply of negative direct voltage, referred to as −V, and operate to shift the level of the data output signal, TVD, and control signal, TVG, relative to the supply voltage, −V.

As illustrated in FIG. 2, the terminal 18 connects to an output gate 42 in series with an inverter circuit 44. The output of the inverter circuit 44 in turn connects to one end of the zener diode DZ1 which has its other end connected to one end of the resistor 50 in common with the first output terminal 48 of the input circuit 40. The other end of the resistor 50 connects to the reference supply of direct voltage, −V.

In a similar fashion, the terminal 17 connects to an input gate 54 in series with an inverter circuit 55. The output of the inverter circuit 55 connects to one end of the zener diode DZ2 which has its other end connected to one end of the resistor 57 in common with a lead connected to the terminal 58. The other end of resistor 57 connects to the reference supply voltage, −V.

As illustrated by FIG. 2, the receiver differential amplifier 74 includes a first pair of transistors 63 and 64 and the second or transmitter differential amplifier 76 includes a second pair of transistors 61 and 62. Additionally, a third pair of transistors 65 and 66 form the third differential amplifier included within the control circuit 70.

Considering first the receiver differential amplifier 74 of the T - R unit in greater detail, each of the transistors 63, and 64 has its emitter electrodes 63a and 64a connected in common to form a junction 68 which in turn connects to one output of the control circuit 70 which operates to selectively apply a first enabling voltage C1. The collector electrode 63c of the same transistor connects to a supply of positive direct voltage, referred to as +V.

The second transistor 64 of the differential amplifier 74 has its collector electrode 74c connected in common to one end of an output lead 33 and to the positive supply voltage +V through a collector load resistor 69. When the differential receiver amplifier 74 directly connects to a balanced line, the base electrode 64b of the transistor 64 connects through the jumper 35 to its output terminal 11. Accordingly, the amplifier 74 functions as a "difference amplifier" and responds to the difference between the voltages applied to output terminals 10 and 11 via the conductors 20a and 20b.

When connected to an unbalanced line, the jumper 35 is eliminated and the base electrode 64b of the transistor 64 connects through the jumper 30 to the supply of negative voltage, $-V_0$ applied via the terminal 31. Therefor, the receiver differential amplifier 74 functions as a comparator and responds to the difference between the signal applied to terminal 10 from conductor 20a and the reference supply voltage, $-V_0$.

The output circuit 80 converts the output of the receiver differential amplifier 74 into a logic signal whose levels are compatible with those of the utilization device associated therewith. Additionally, the output circuit 80 operates to reject any high frequency noise signals appearing at the output circuit of the receiver differential amplifier 74. In particular, the output circuit 80 connects to receive an input signal appearing on the lead 33 from the output collector circuit of the receiver differential amplifier 74. The lead 33 is buffered by its connection to a gate 82 connected in series with an inverter circuit 84. The output of the inverter circuit 84 is connected to drive a slope control gate 86 connected in series with an inverter circuit 88. The term "slope control" means that the slope of the bilevel signals are controlled by a miller capacitor 89 connected across the output circuit 88. The capacitor 89 defines the rate of change of voltage applied to output terminal 32 and the capacitor is selected to have a capacitance value which limits the rate of voltage change which in turn limits the amount of generated noise.

In greater detail, the transmitter line driver differential amplifier 76 has the emitter electrodes 61a and 62a respectively of each of its transistors 61 and 62 connected to form a common junction 67. The junction 67 in turn connects to another or second output of the control circuit 70 which operates to selectively apply thereto the enabling voltage referred to as C2. A base electrode 61b of the transistor 61 connects to the terminal 48 of its portion of the input circuit 40 and its collector electrode 61c connects in common with the base electrode 63b of the receiver differential amplifier transistor 63 to its output terminal 10. The transistor 62 has its collector electrode 62c connected to its output terminal 11 and its base electrode 62b connected to the bias supply voltage $-V_3$ applied via terminal 36.

In greater detail, as shown in FIG. 2, the transistor 65 of the third differential amplifier has its collector electrode 65c connected to the emitter electrodes 61a and 62a of the amplifier 76 via junction 67, while the transistor 66 has its collector electrode 66c connected to the emitter electrodes 63a and 64a of the amplifier 74 via junction 68. The emitter electrodes 65a and 66a of the transistors 65 and 66 connect in common to a terminal 53 which in turn connects to the voltage source, $-V$, through an emitter resistor 52. Hence, the supply voltage $-V$ and resistor 52 provide a source of direct current to the common emitter circuit of the third differential amplifier 70 via the terminal 53.

The base electrode 65b of the first transistor 65 of the third differential amplifier connects to the terminal 58 for receiving the shifted bilevel control signal from its portion of the input circuit 40. The base electrode 66b of the second transistor 66 of the differential pair connects to the bias supply voltage $-V_2$ applied via the terminal 34.

It should be noted that both the input circuit 40 and the output 80 may be constructed using well known integrated circuits. For example, conventional diode transistor logic such as that described in the text of J. Millman and H. Taub titled "Pulse, Digital and Switching Waveforms," McGraw-Hill Book Company, Copyright 1965, may be used in such construction.

The operation of the transmit-receive (T - R) unit will now be described with reference to FIGS. 1, 1a, 2 and 3. Briefly, the receiver differential amplifier 74 functions as a high impedance receiver of direct current differential line signals from the transmission line 20 by way of its terminals 10 and 11 and transfers these signals as a logical level to its utilization device. The line driver differential amplifier 76 functions as a high impedance transmitter which translates a data input signal from its utilization device into direct current differential signals which it applies to the conductors 20a and 20b of the transmission line 20 via the same pair of output terminals 10 and 11.

The third differential amplifier included within the control circuit 70 in response to a bilevel control signal operates to selectively enable the transmitter differential amplifier 76 and receiver differential amplifier 74. This is accomplished by the control circuit 70 applying through first and second paths the control signals C1 and C2 respectively to the common emitter circuits of the receiver and transmitter amplifiers 74 and 76.

More particularly, the pair of transistors of the third differential amplifier circuit in response to the bilevel control signal operate to selectively connect the emitter common circuits of the transmitter and receiver differential amplifiers to the source of current connected to the terminal 53.

DESCRIPTION OF RECEIVER OPERATION

Figure 3:
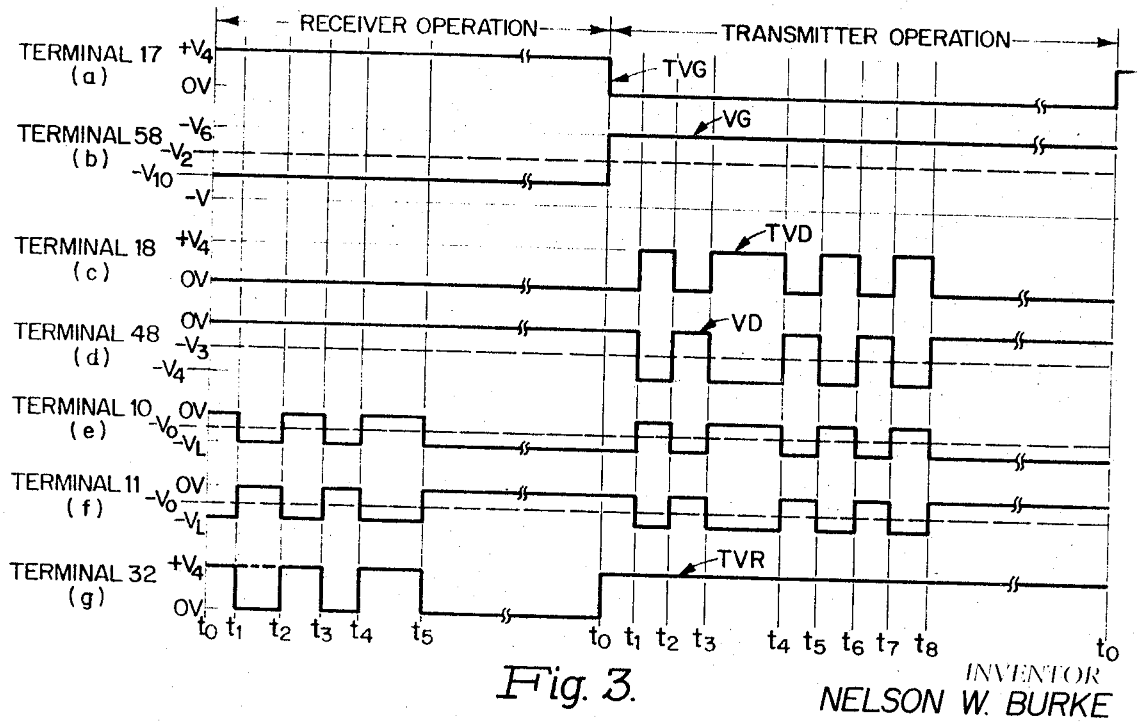
FIG. 3 is a composite set of waveforms used to illustrate the operation of a typical embodiment of the invention.

First, a receiver operation will be considered with reference to FIGS. 1 and 2 together with the waveforms a, b, e, f and g of FIG. 3. Normally, the transmission line system of FIG. 1a operates half-duplex and therefor at any given instant of time only one T - R unit is conditioned to operate in the transmit mode while the remaining T - R units are conditioned to operate in a receive mode. With reference to FIG. 3, at time $t_0$ the T - R unit under consideration is assumed to be conditioned by its utilization device to operate the receive mode. Accordingly, the utilization device switches the bilevel control signal, TVG, applied to the terminal 17 to a positive $+V_4$ level as illustrated by waveform a of FIG. 3. Referring to FIG. 2, the positive voltage level applied to the gate 54 via the terminal 17 is inverted by the inverter 55 and applied to the end of the zener diode DZ2. The voltage level shifting network including the zener diode DZ2 and resistor 57, shifts the voltage level of signal TVG from a positive voltage to a negative voltage of which a magnitude approximates that of the $-V_{10}$ less negative than reference voltage, $-V$. The network in turn applies this voltage level as one level of the control signal, VG, (i.e. labeled as waveform b of FIG. 3) to the base electrode 66b of transistor 66 via the terminal 58.

It is to be noted that by way of example, the voltage levels $-V_6$ and $-V_{10}$ of the bilevel control signal, VG, are negative voltages whose values fall midway between the value of fixed bias reference voltage, $-V_2$.

Because the voltage level $-V_{10}$ of control signal VG is more negative than the fixed reference voltage, $-V_2$ applied to the base electrode 66b of the transistor 66, transistor 65 is held cutoff while transistor 66 is conductive.

The transistor 66 when conductive provides a path by which the current source terminal 53 is connected to the common emitter circuit junction 68 of the receiver circuit 74. When so connected, the receiver differential amplifier 74 is enabled by conductive transistor 66 which functions as a current source for the pair of transistors 63 and 64. At the same time, transistor 65 by not being conductive disables the transmitter differential amplifier 76 and hence while the T - R unit operates in the receive mode, the amplifier 76 dissipates no power. Initially, at time $t_0$, the line 20 is inactive (i.e., assumes a binary ZERO state) wherein the differential signal $V_a$ appearing on conductor 20a is at zero volts and its complement signal $V_b$ appearing on conductor 20b is at $-VL$ volts. As illustrated by waveforms (e) and (f) of FIG. 3, the signals $V_a$ and $V_b$ of zero volts and $-V_L$ volts are applied respectively to the terminals 10 and 11 and thence to the base electrode 63b of the transistor 63 and in the balanced arrangement to the base electrode 64b of the transistor 64. Accordingly, the transistor 63 conducts while the transistor 64 remains non-conductive.

When connected, in the balanced arrangement, the transistor 63 and 64 respond to the difference in voltage between the differential line signals $V_a$ and $V_b$. While in the unbalanced arrangement, the transistors 63 and 64 respond to the difference in voltage between the signal $V_a$ and the reference voltage $-V_0$.

With transistor 64 cutoff, the voltage at the collector electrode 64c increases and approximates the positive collector supply voltage $+V$.

The inverter circuit 84 inverts the positive voltage on lead 33 derived from the collector electrode 64c of transistor 64 and applies an input signal to the input gate 86 of slope controlled inverter 88. The inverter 88 in response to the input signal from inverter 84 drives the signal TVR appearing on the terminal lead 32 to a positive $+V_4$ voltage level as illustrated by waveform g of FIG. 3. The utilization device connected to terminal 32 interprets the positive $+V_4$ level of the signal TVR as binary ZERO data.

As previously mentioned, the bias voltage $+V$ allows T - R units to be added to the system of FIG. 1. More particularly, when the line 20 is a binary ZERO state, the bias supply $+V$ provides sufficient voltage to render conductive the receiver amplifier 74 transistor 63 of all T - R units conditioned to operate in the receive mode.

At time $t_1$, the line 20 becomes active (i.e. assumes a binary ONE state) wherein the differential signal $V_a$ appearing on conductor 20a is at $-VL$ volts and its complement, the signal $V_b$, appearing on conductor 20b, is at a zero volt. As illustrated by waveforms (e) and (f) of FIG. 3, the terminals 10 and 11 respectively are at $-VL$ volts and zero volts. The voltages $-VL$ volts and zero volts respectively are applied to the base electrodes 63b and 64b of transistors 63 and 64 making transistor 63 conductive and transistor 64 non-conductive. Responding either to the difference between the voltages of the waveforms (e) and (f) of FIG. 3, or the difference between the voltage of the waveform (e) and reference voltage $V_0$, the transistor 64 conducts hard enough to drive its collector voltage from $+V$ volts to approximately zero volts. The zero volt signal, applied to the output circuit 80 on lead 33, is converted by the inverter 84 and applied to the inverter circuit 88. The inverter in response to the inverted input signal from the inverter 84 drives the $+V_4$ volt level terminal 32 to zero volts (i.e. see waveform g of FIG. 3). As mentioned previously, the inverter circuit 88 by controlling the rise time of the output voltage signal removes all high frequency components. The above change in the voltage level of the signal, TVR, at the terminal 32, is interpreted by the utilization device as binary ONE data.

At the times $t_2$, $t_3$, $t_4$ and $t_5$, the transistors 63 and 64 respond in the above described manner to either the differences in voltages between the waveforms (e) and (f) of FIG. 3 or the differences in voltage between the waveform e and the reference voltage $V_0$. This in turn results in those changes to the signal TVR illustrated by waveform (g) of FIG. 3.

DESCRIPTION OF TRANSMITTER OPERATION

Now the operation of the transmitter circuit will be considered with specific reference to FIGS. 1, 1a, 2 and the waveforms a – f of FIG. 3. At some later time, $t_1$, it is assumed the same utilization device switches its T - R unit to the transmit mode. The utilization device accomplishes this by switching the bilevel control signal, TVG, applied to terminal lead 17 from a positive $+V_4$ volts to zero volts as illustrated by waveform a of FIG. 3. Referring now to FIG. 2, the low value of gate input voltage (i.e., zero volts) is inverted by the inverter circuit 55 and is applied to one end of the zener diode DZ2. The voltage shifting network including zener diode DZ2 and resistor 57 shifts the voltage level of signal TVG applied at terminal 17 from zero volts to a negative voltage which is more positive than the reference voltage $-V_2$ applied to the base 66b of the transistor 66 (i.e., see waveform b of FIG. 3). The network in turn applies this voltage level as a second level of the control signal, VG, to the base electrode 66b of the transistor 66 via the terminal 58. Accordingly, transistor 65 becomes conductive and transistor 66 is switched to cutoff. Transistor 65 when conductive provides a path which connects the current source terminal 53, previously connected to common emitter junction 68, to the common emitter junction 67 of the transmitter differential circuit 76. When so connected, the transistor 65 functions as a source of current for the pair of transistors 61 and 62.

Simultaneously therewith, the transistor 64 by not being conductive disables the receiver circuit 74 thereby making available to the transmitter circuit 76 power which it can dissipate without exceeding maximum power requirements of the T - R unit. This is particularly important when T - R unit is constructed with integrated circuits which have low power dissipation capabilities. Furthermore, by disabling the receiver circuit 74, the transmitter circuit 76 is able to supply more power to the transmission line load (i.e., termination leads 16). Hence, the T - R unit is able to drive lower values of load impedances as compared to the situation where the line 20 is terminated in an impedance value which equals the line characteristic impedance.

Continuing with the transmitter operation, at time $t_0$, the utilization device initially applies a data input signal, TVD, of ZERO volts (i.e., representative of a binary zero data) to the gate 42 by way of the terminal 18. The inverter circuit 44 in response to the data input signal, TVD, produces an output signal which is applied to one end of the zener diode DZ1. The level shifting network including the zener diode DZ1 and the resistor 50 shifts the voltage level of the inverted signal to a value of zero volts. This voltage bilevel is applied as one level of the signal, VD, to the base electrode 61b of the transistor 61 via the terminal 48. As illustrated by waveform (d) of FIG. 3, the voltage level of data signal, VD, is more positive than the negative reference voltage $-V_3$ applied to the base 62b of the transistor 62. Therefor, transistor 61 becomes conductive and transistor 62 is switched to cutoff.

Both the transistors 61 and 62 operate to convert the zero volt data signal $V_D$ into direct current line differential signals which are in turn applied to the conductors 20a and 20b via its pair of output terminals 10 and 11. More particularly, with reference to FIG. 1a, the amplifier 76 drives current from the common reference potential 24 (illustrated as ground) through the external load, (i.e., upper line termination 16) conductor 20a, and the collector-emitter electrodes of transistor 61. This causes the signal $V_a$ developed across conductor 20a to assume a value of $-VL$ volts. The signal $V_a$ propagates along the transmission line 20 and appears as an input to the receiver amplifier 74 circuit of each of the other utilization devices.

Because during the time $t_0$, the transistor 62 is nonconductive, current does not flow through the conductor 20b and hence the signal $V_b$ is at zero volts. In an unbalanced line arrangement, the transmitter differential amplifier 76 has its terminal 11 connected to the common reference potential 24, illustrated as ground. However, since the transistor 62 is non-conductive, no current flows therethrough. The above described changes in line voltages are illustrated by waveforms (e) and (f) of FIG. 3.

At time $t_1$, the utilization device switches the data input signal TVD, from zero volts to a positive $+V_4$ volts (i.e., representative of a binary ONE data) which is applied to gate 42 by way of the terminal 18. The inverter circuit 44 inverts $+V_4$ volt signal and applies it to one end of the zener diode DZ1. The level shifting network shifts this voltage to a voltage level $-V_4$ which is less positive than the negative reference voltage $-V_3$, applied to the base electrode 62b of the transistor 62. The network applies this voltage level in the form of the signal VD to the base electrode 61b of the transistor 61.

Accordingly, transistor 62 conducts and transistor 61 is switched to cutoff. Again, both the transistors 61 and 62 operate to convert the device generated $+V_4$ volt data signal, VD, into differential line driving signals which are applied to the conductors 20a and 20b via output terminals 10 and 11. Again with reference to FIGS. 1a and 2, the differential amplifier 76 drives the common reference potential 24 (i.e., ground) through the external load (i.e., line terminations 16), conductor 20b and thence through collector-emitter electrodes of the transistor 62. This switches the signal $V_b$ developed across the conductor 20b from zero volts to $-VL$ volts. The signal $V_a$ propagates along transmission line 20 and is applied to the receiver circuit 74 of each of the utilization devices. Since transistor 61 is cutoff during this period time, no current flows through conductor 20a and the signal $V_a$ is switched from $-VL$ volts to zero volts. The same is true for the unbalanced line arrangement. The foregoing changes in signals $V_a$ and $V_b$ are illustrated by the waveforms (e) and (f) in FIG. 3.

During the remaining times $t_2 - t_8$, the utilization device changes the data input signal TVD (i.e., pattern of binary ONE and ZERO data) in the manner illustrated by waveform c of FIG. 3. The corresponding changes to the signals $V_a$ and $V_b$ developed across the conductors 20a and 20b respectively are illustrated by the waveforms e and f in FIG. 3.

At some later time $t_0$, as illustrated by waveform a of FIG. 3, the utilization device terminates its transmission of data by switching the signal TVG on terminal lead 17 from zero volts to $+V_4$ volts.

Briefly summarizing the above operation, when the signal VD is more positive than reference voltage $-V_3$ (i.e., when the utilization device transmits binary ZERO data) the transistor 61 of the differential amplifier 76 supplies current to the transmission line 20. However, when the voltage signal VD is less positive than reference voltage $-V_3$ (i.e., when the utilization device transmits binary ONE data), transistor 62 supplies current to the transmission line 20.

The foregoing description has illustrated a single transmit-receive unit which is easily conditioned to operate in receive and transmit modes wherein in a receive mode, the unit transfers data from a line to its utilization device and in a transmit mode, the unit transfers data from the same device to the line. In the illustrated embodiment of the transmit-receive unit, each of the three differential amplifier circuits are preferably operated in an unsaturated condition to permit high speed operation, to provide high input impedance and to reduce power dissipation. However, it will be appreciated that the amplifiers can be operated in alternate ways (e.g., saturation, controlled saturation) without departing from the teachings of the present invention.

Moreover, while the operation of each of transistor amplifiers has been described with reference to a "current mode" of operation, this is not to be construed as a limitation of the present invention. The "current mode" of operation was selected because of the many advantages attendant therewith (e.g., smaller voltage swing, lower power dissipation, inherent protection of drivers in the event of short circuits, etc.).

It is also to be noted that while the transmit-receive unit has been described as operating in either a transmit or receive mode, other modes of operation also are possible. For example, it may be desirbale to operate the unit in both modes simultaneously or to operate the unit in neither mode, in which instance, the unit dissipates minimum power. In implementing these last mentioned modes, the control circuit 70 need only have additional states in which both control signals C1 and C2 are either "on" or "off."

It will be appreciated by those skilled in the art that still various other changes may be made to the illustrated embodiment without departing from the spirit and scope of the invention. For example, although all transistors disclosed have been NPN devices, it will be understood that PNP transistors may also be utilized. Additionally, while most circuits have been disclosed as referenced to negative values of supply voltages, it is obvious that different values and polarities of voltages can also be utilized. Furthermore, the collectors of certain transistors can be terminated in alternate ways (e.g., through a collector load resistor to ground) without departing from the scope of the invention.

While in accordance with the provisions and statutes there has been illustrated and described the best form of the invention known, certain changes may be made in the circuits described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A data transmission line system for interconnecting a plurality of terminal devices through a two conductor line for communication, said system comprising: a plurality of transmit-receive elements, T-R1 through T-Rn, each element being coupled to a different one of said terminal devices for transmitting and receiving bilevel information between said one device and said line, said element having at least a pair of line terminals, each one of said line terminals being coupled to a different one of the conductors of said line, a data terminal TVD, for receiving a bilevel data input signal from said terminal device, a gate input terminal, TVG, for receiving a bilevel control switching signal from said device, and a receiver terminal, TVR, for passing a bilevel logic signal from said transmit-receive element to said device in response to information signals applied to said line terminals and each of said elements further including first and second amplifiers, said first amplifier having first and second inputs and at least one output, said second amplifier having an input and first and second outputs, said inputs respectively of said first amplifier being connected to said line terminals in common with said first and second outputs of said second amplifier, said output of said first amplifier being coupled to said receiver terminal, TVR, said data terminal, TVD, being coupled to said input of said second amplifier; a bias voltage source; means for connecting one of said conductors of said line to said source and the other of said conductors of said line to a reference potential; and, means for applying at least one bilevel logic switching signal to said first and second amplifiers from each of said TVG input terminals from said devices to define a transmit-receive mode of operation for each of said elements and said system.

2. The system of claim 1 wherein said system transmit-receive mode is half-duplex for which the logic signal applied to said TVG terminal of one of said elements is set to a one level of said bilevel signal and the logic signal applied to the TVG terminal of the remaining elements is set to the other level of said bilevel signal.

3. A differential line driver-receiver device comprising:

a first differential amplifier including a pair of input circuits for receiving data output signals from a pair of lines, first differential output circuits, said pair of input circuits being connected to receive a first common control signal;

a second differential amplifier including first input circuit for receiving a data input signal, a second input circuit for receiving a first reference input signal, second differential output circuits for generating output data signals, said first input circuit coupled to one of said pair of input circuits through one of said second differential output circuits connected to a first one of said lines, said second input circuit coupled to the other of said pair of input circuits through another of said second differential output circuits connected to a second one of said lines, said other pair of input circuits of said second differential amplifier being connected to receive a second common control signal; and, a third differential amplifier including a first input circuit for receiving a bilevel control signal, a second input circuit for receiving a second reference input signal, and first and second differential output circuits connected to apply alternately said first and second common control signals to said first and second amplifiers, respectively.

4. The device of claim 3 wherein said first differential amplifier means, said second differential means and said third differential amplifier means, each includes first and second amplifying transistors, each having emitter, base and collector electrodes;

said first and second transistors of said first differential amplifier having said emitter electrodes connected to receive said first common control signal, input circuits connected to a different one of said base electrodes for receiving bilevel complementary data signals from said lines and one of said first differential output circuits connected to said collector electrode of said first transistor;

said first and second transistors of said second differential amplifier having said emitter electrodes connected to receive said second common control signal, said first input circuit connected to said base electrode of said first transistor, said second input circuit connected to said base electrode of said second transistor, each of said second differential output circuits connected to a different one of said collector electrodes; and said first and second transistors of said third differential amplifier including said emitter electrodes connected to an enabling voltage, said input circuit of said third differential connected to the base electrode of said first transistor, said second input circuit connected to the base electrode of said second transistor, said first and second differential output circuits respectively connected to said first and second transistor collector electrodes whereby said third differential amplifier when conditioned by one level of said control signal only applies said enabling voltage corresponding to said first common control signal through the emitter and collector electrodes of said second transistor and when conditioned by the other level only applies the same enabling voltage corresponding to said common control signal through the emitter and collector electrodes of said first transistor.

5. The device of claim 4 wherein said bilevel control signal and data input signals are logic levels and said second and third differential amplifiers includes a level shifting means connected in series with said base electrode of each of said first transistors for receiving said data input signal and said bilevel control signal respectively and for converting said data input signal and said bilevel logic control signal to predetermined voltage levels for application to said base electrodes.

6. The device of claim 4 wherein said one of said first differential output circuits of said first differential amplifier includes slope control circuit means for producing a slope controlled logic output signal to a utilization device.

7. The device of claim 4 wherein said first reference potential has a value which lies midway between the two levels of said bilevel control signal applied to said base electrode of said first transistor of said third differential amplifier.

8. The device of claim 4 wherein said lines are a twisted two conductor pair connected in a balanced arrangement.

9. The device of claim 4 wherein one of said input circuits of said first differential amplifier includes means connected to the base electrode of one of said transistors for operating said first differential amplifier alternatively in a balanced and unbalanced line arrangement.

10. The device of claim 9 wherein said means includes a pair of jumpers and a source of reference potential, one of said jumpers connecting said base electrode to said line and the other of said jumpers connecting said base electrode to said source of reference potential wherein when connected in an unbalanced arrangement said base electrode only connects through said one jumper means to said source of reference potential.

11. A transmit-receive unit for interconnecting a utilization device to a two conductor transmission line at a single point along its length, said unit comprising:

a first differential amplifier means for receiving bilevel data signals from said line conductors, said amplifier means having first and second amplifying transistors each having emitter, collector, and base electrodes, each of said base electrodes connected to a different conductor of said line, said emitter electrodes connected to a first common control circuit for receiving a first control signal and said differential amplifier means having at least one collector electrode connected to a load impedance for producing data signals in response to said bilevel data signals applied to said base electrodes from said conductors; and a second differential amplifier means for transmitting bilevel data signals to said line conductors, said second amplifier means having third and fourth amplifying transistors each having an emitter, collector, and base electrodes; said emitter electrodes connected in common to a second common control circuit for receiving a second control signal and each said collector electrodes connected in common with said base electrodes of said first differential amplifier means, one of said base electrodes connected to receive a data signal input from said utilization device and the other of said base electrodes connected to a first reference potential, and said unit responsive to the alternate application of said first and second control signals to be enabled respectively for receive and transmit modes of operation.

12. The unit of claim 11 further including current source means; and third differential amplifier means, said third differential amplifier means including fifth and sixth amplifying transistors each having emitter, base and collector electrodes, said emitter electrodes connected to said current source means, said fifth transistor collector electrode connected to said second common control circuit and said sixth transistor collector electrode connected to said first common control circuit, said fifth transistor base electrode connected to receive a second reference signal and said sixth transistor base electrode connected to receive bilevel gate control signal whereby said third differential amplifier means is responsive to said gate control signal to selectively connect said current source to said first and second common control circuits.

13. The unit of claim 12 wherein the amplifying transistors of said first, second and third differential amplifier means are of the same conductivity.

14. The unit of claim 12 wherein one level of said gate control signal renders only said fifth transistor conductive and said other level of said control signal renders only said sixth transistor conductive.

* * * * *